United States Patent
Sadovsky et al.

(10) Patent No.: US 9,692,665 B2
(45) Date of Patent: Jun. 27, 2017

(54) FAILURE ANALYSIS IN CLOUD BASED SERVICE USING SYNTHETIC MEASUREMENTS

(71) Applicant: Microsoft Corporation, Redmond, WA (US)

(72) Inventors: Art Sadovsky, Bellevue, WA (US); Timur Sadykov, Redmond, WA (US); Venkat Narayanan, Redmond, WA (US); Smita Ojha, Seattle, WA (US); Jon Avner, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 149 days.

(21) Appl. No.: 14/447,611

(22) Filed: Jul. 30, 2014

(65) Prior Publication Data

US 2016/0036671 A1 Feb. 4, 2016

(51) Int. Cl.
*H04L 12/26* (2006.01)
*H04L 12/24* (2006.01)

(52) U.S. Cl.
CPC ...... *H04L 41/5032* (2013.01); *H04L 41/5035* (2013.01); *H04L 41/5038* (2013.01); *H04L 41/5096* (2013.01)

(58) Field of Classification Search
CPC ...... G06F 11/07; G06F 11/30; G06F 11/3072; G06F 11/34; H04L 41/0816; H04L 63/1416; H04L 43/00; H04L 43/045; H04L 43/0852; H04L 43/0888; H04L 43/16

USPC .......................................................... 709/224
See application file for complete search history.

(56) References Cited

U.S. PATENT DOCUMENTS

| | | | |
|---|---|---|---|
| 6,018,300 A | 1/2000 | Dowden et al. | |
| 6,170,067 B1 | 1/2001 | Liu et al. | |
| 6,446,058 B1 | 9/2002 | Brown | |
| 7,313,736 B2 | 12/2007 | Scrandis et al. | |
| 8,612,802 B1* | 12/2013 | Havemose | G06F 11/0715 714/26 |
| 8,983,961 B2* | 3/2015 | Chan | G06F 9/455 707/639 |
| 9,197,495 B1* | 11/2015 | Rauser | H04L 41/0677 |
| 2006/0212771 A1* | 9/2006 | Fabbrocino | G06F 11/0793 714/746 |
| 2008/0147684 A1* | 6/2008 | Sadovsky | G06Q 10/10 |
| 2011/0154091 A1 | 6/2011 | Walton et al. | |

(Continued)

OTHER PUBLICATIONS

Mitchell, et al., "IBM POWER5 Processor-based Servers: A Highly Available Design for Business-Critical Applications", In Whitepaper of IBM, Aug. 16, 2006, 44 pages.

*Primary Examiner* — Ruolei Zong
(74) *Attorney, Agent, or Firm* — Turk IP Law, LLC

(57) ABSTRACT

A failure analysis of a cloud based service is provided using synthetic measurements of the cloud based service. The synthetic measurements associated with a customer experience is executed on the cloud based service to determine a health of the cloud based service. The synthetic measurements simulate the customer experience which includes a use scenario of a customer of the cloud based service. Failures associated with the health of the cloud based service are aggregated, where the failures are detected from the synthetic measurements. A distribution is generated from the failures. The distribution is presented to a stakeholder.

18 Claims, 7 Drawing Sheets

(56) References Cited

U.S. PATENT DOCUMENTS

| | | | |
|---|---|---|---|
| 2012/0023221 A1* | 1/2012 | Dayan | G06F 11/3006 709/224 |
| 2013/0061092 A1 | 3/2013 | Gupta et al. | |
| 2013/0086203 A1* | 4/2013 | Avner | G06F 11/3495 709/217 |
| 2013/0166967 A1 | 6/2013 | Jerde et al. | |
| 2013/0275518 A1* | 10/2013 | Tseitlin | G06F 11/36 709/206 |
| 2013/0332510 A1* | 12/2013 | Pritchett | H04L 67/10 709/203 |
| 2013/0339801 A1 | 12/2013 | Ramaiah | |
| 2014/0172371 A1* | 6/2014 | Zhu | G06F 11/0709 702/185 |

\* cited by examiner

FAILURE ANALYSIS IN CLOUD BASED SERVICE USING SYNTHETIC MEASUREMENTS

BACKGROUND

Distributed computing technologies have enabled multiple computing resources to provide coordinated and distinct solutions. An example of distributed computing, cloud computing brings together multiple systems to provide solutions to user needs. Cloud computing can span a vast array of computing resources. The computing resources utilized in cloud computing applications and services are dispersed across networks and locations. Dispersed computing resources are remotely controlled and managed. Usually, manual solutions provide installation and configuration support to cloud computing assets. Manual installation solutions by human components of widely dispersed computing resources are not cost effective.

Conventional error monitoring solutions for cloud computing systems have limitations. Individual components of the cloud computing systems monitor health related metrics locally. Information generated by monitoring processes are usually consumed locally. Any actions based on the information are attempted locally and results of the actions may be logged or discarded locally.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing failure analysis in a cloud based service using synthetic measurements. In some example embodiments, a management application of the cloud based service may execute synthetic measurements associated with a customer experience on a cloud based service to determine a health of the cloud based service. The customer experience may include a use scenario of a customer associated with the cloud based service. Failures associated with the health of the cloud based service may be aggregated, where the failures may be detected from the synthetic measurements. A distribution may be generated from the failures. The distribution may be presented to a stakeholder that includes a team associated with a component of the cloud based service that generates the one or more failures.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
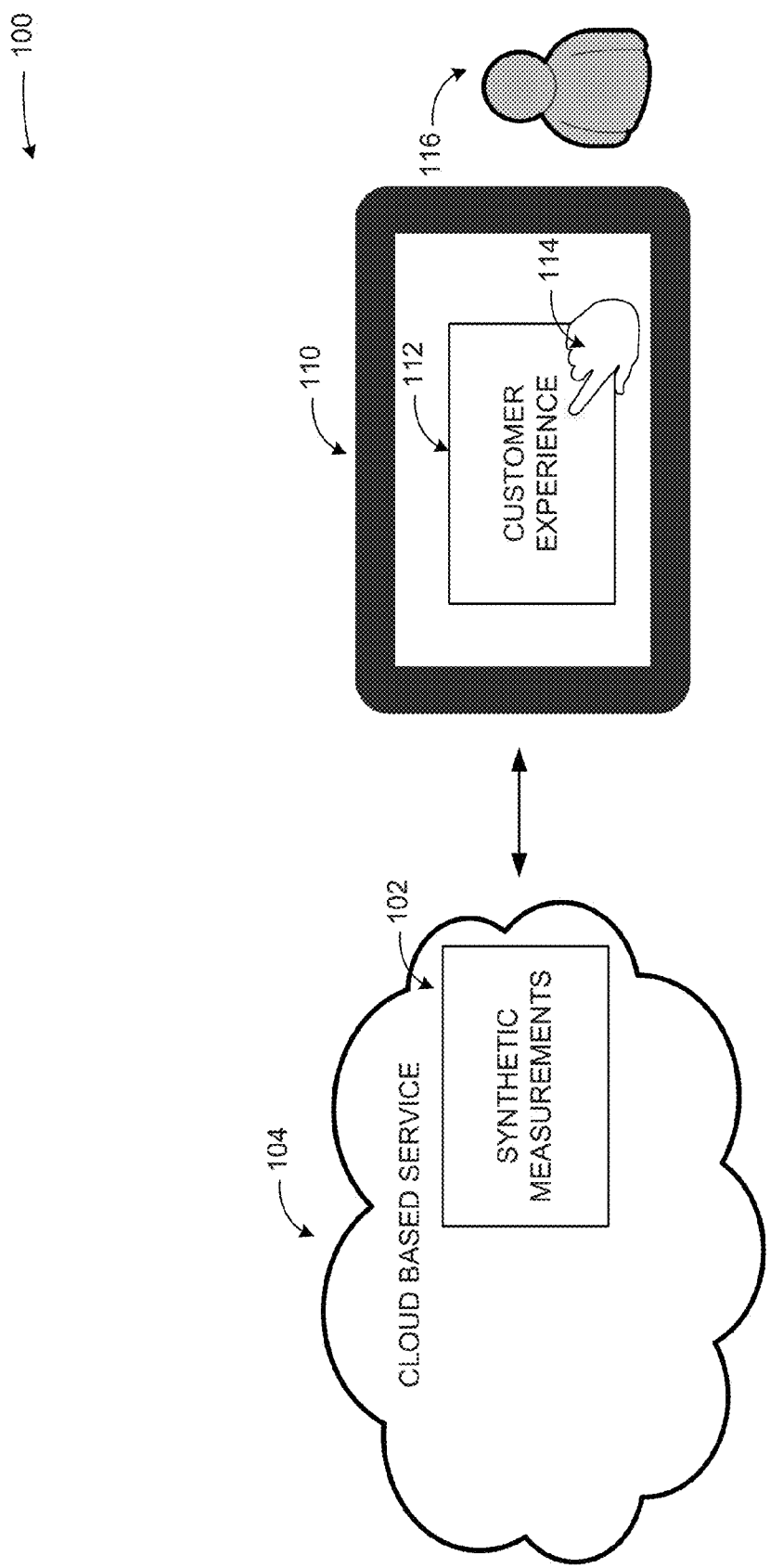
FIG. 1 is a conceptual diagram illustrating an example of failure analysis in a cloud based service using synthetic measurements, according to embodiments.

As briefly described above, analysis of failures in a cloud based service may be provided using synthetic measurements by a management application associated with the cloud based service. Synthetic measurements associated with a customer experience may be executed on a cloud based service to determine a health of the cloud based service. Failures associated with the health of the cloud based service may be aggregated, where the failures may be detected from the synthetic measurements. A distribution may be generated from the failures. The distribution may be presented to a stakeholder.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

Throughout this specification, the term "platform" may be a combination of software and hardware components to provide failure analysis in a cloud based service using synthetic measurements. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

FIG. 1 is a conceptual diagram illustrating an example recovery of failure analysis in a cloud based service using synthetic measurements, according to embodiments.

In a diagram 100, a cloud based service 104 may provide services to a customer 116 through a client device 110. The cloud based service 104 may provide an expansive variety of services through a client interface at the client device 110. The services may include document sharing, e-mail services, storage services, among others. In addition, the customer 116 (who is authorized to interact with the client device 110) may be an entity that includes a person, multiple persons, a group of persons, an organization, among others.

The cloud based service 104 may be a distributed application that provides services through one or more computing devices that execute one or more components of the distributed application. The one or more computing devices may be connected through one or more networks that use wired or wireless infrastructure. An example of the cloud based service 104 may include an e-mail service. The e-mail service may be hosted in multiple computing devices. The e-mail service may be divided between the computing devices based on an available processing capacity of each computing device. In another example scenario, the cloud based service 104 may include a document sharing service. The document sharing service may distribute stored documents across multiple computing devices based on available storage capacity of each computing device. The examples of the cloud based service 104 as an e-mail service and a document sharing service were not provided in a limiting sense. The cloud based service 104 may include any distributed computation solution that provides a service to one or more customers such as the customer 116.

The customer 116 may be allowed to interact with the cloud based service 104 through the client device 110. The client device 110 may include a number of computing devices such as a desktop computer, a smart phone, a notebook computer, a tablet computer, among others. The customer 116 may interact with the cloud based service 104 through a client interface of the cloud based service 104 that is provided by the client device 110. Alternatively, the cloud based service 104 may provide the client interface and the client device 110 may render the client interface within a client application. The customer 116 may interact with the client interface through a number of input modalities that may include a touch based action 114, a keyboard based input, a mouse based input, among others. The touch based action 114 may include a number gestures such as touch action, a swipe action, among others.

One or more interactions of the customer 116 with the client interface of the cloud based service 104 may be encompassed within a customer experience 112. The customer experience 112 may be a container for a use scenario associated with the cloud based service 104. An example of the customer experience 112 may include the customer 116 initiating the client interface of an e-mail service and reading one or more e-mails associated with a user account of the customer 116. Another example of the customer experience 112 may include the customer 116 initiating an editing client interface of a document sharing service to edit the document. The customer experience 112 may also include the customer 116 editing the document and saving the document.

The customer experience 112 may be defined in synthetic measurements 102 to simulate the customer experience 112. The synthetic measurements 102 may include a number of commands to duplicate the customer experience 112. The synthetic measurements 102 may be executed on the cloud based service 104 to determine a health of the cloud based service 104. The synthetic measurements may detect one or more failures associated with the cloud based service 104. The failures may be aggregated into a distribution which may be presented to a stakeholder of the cloud based service 104.

While the example system in FIG. 1 has been described with specific components including the cloud based service 104 and the synthetic measurements 102, embodiments are not limited to these components or system configurations and can be implemented with other system configuration employing fewer or additional components.

Figure 2:
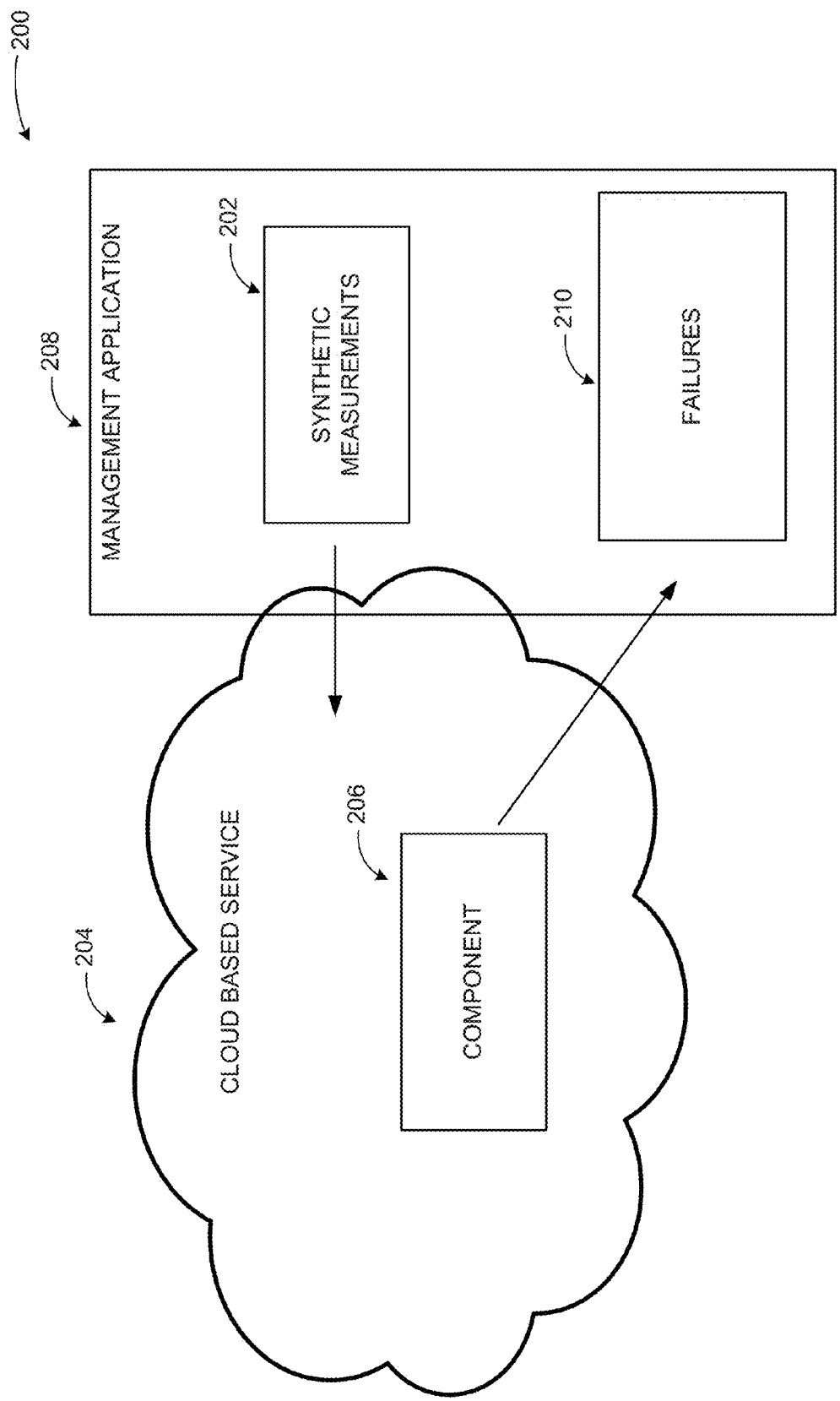
FIG. 2 illustrates components of a scheme to analyze failures in a cloud based service using synthetic measurements, according to embodiments.

FIG. 2 illustrates components of a scheme to analyze a failure in a cloud based service using synthetic measurements, according to embodiments.

In a diagram 200, a scheme to analyze failures 210 on a cloud based service 204 using synthetic measurements 202 may be described. A management application 208 may execute the synthetic measurements 202 on the cloud based service 204. The failures 210 may be detected on a component 206 of the cloud based service 204 from the synthetic measurements 202. The synthetic measurements may simulate a customer experience at the cloud based service 204 that includes a use scenario of the cloud based service by a customer.

The management application 208 may include an application that monitors and manages the cloud based service 204. The management application 208 may be a component of the cloud based service 204. Alternatively, the management application 208 may be a standalone application that may be authorized to interact with the cloud based service 204.

The failures 210 may be analyzed for an aggregation operation based on one or more shared characteristics. The characteristics may include a location of the component 206 associated with the failures 210. The characteristics may also include an identification of the component 206 associated with the failures 210.

A subset of the failures 210 may be matched to one or more recovery actions associated with the cloud based service 204. The recovery actions may allow the management application 208 to resolve the subset of the failures 210 automatically. Automated resolution processes may be managed internally by the cloud based service 204. A stakeholder may not be informed about the recovery actions that may be executed by the management application 208. As such, the subset of the failures 210 that map to a recovery action may be removed from a report transmitted to the stakeholder that may include a distribution of the failures 210.

Alternatively, the failures 210 may also be extrapolated from usage data. Usage data may also be referred to as passive data. The usage data may include measurements of one or more operations associated with a use scenario of the cloud based service 204. The measurements may capture errors associated with the use scenario of the cloud based service 204. A client device associated with the cloud based service 204 may capture the usage data and transmit the usage data to an analysis application such as the management application 208. The management application 208 may process the usage data to detect the failures 210 based on a number of errors reported by the usage data that exceed a threshold that may be configured by a stakeholder of the cloud based service 204. In addition, usage data may also be anonymized to remove private data such as location of a customer, among others. The failures 210, detected from usage data, may also be processed with an aggregation operation based on one or more shared characteristics, similar to an aggregation operation used to process failures generated by the synthetic measurements 202.

The usage data may be captured in log files by the client device and transmitted to the management application. The management application 208 may parse the log files to extract information associated with the failures 210. Alternatively, the management application 208 may retrieve the usage data from other sources such as devices of the cloud based service 204. The cloud based service 204 may allocate resources to capture measurements of use scenarios associated with customers. The measurements may be stored as the usage data and made available to analysis applications such as the management application 208 for monitoring and analysis of the failures 210.

Figure 3:
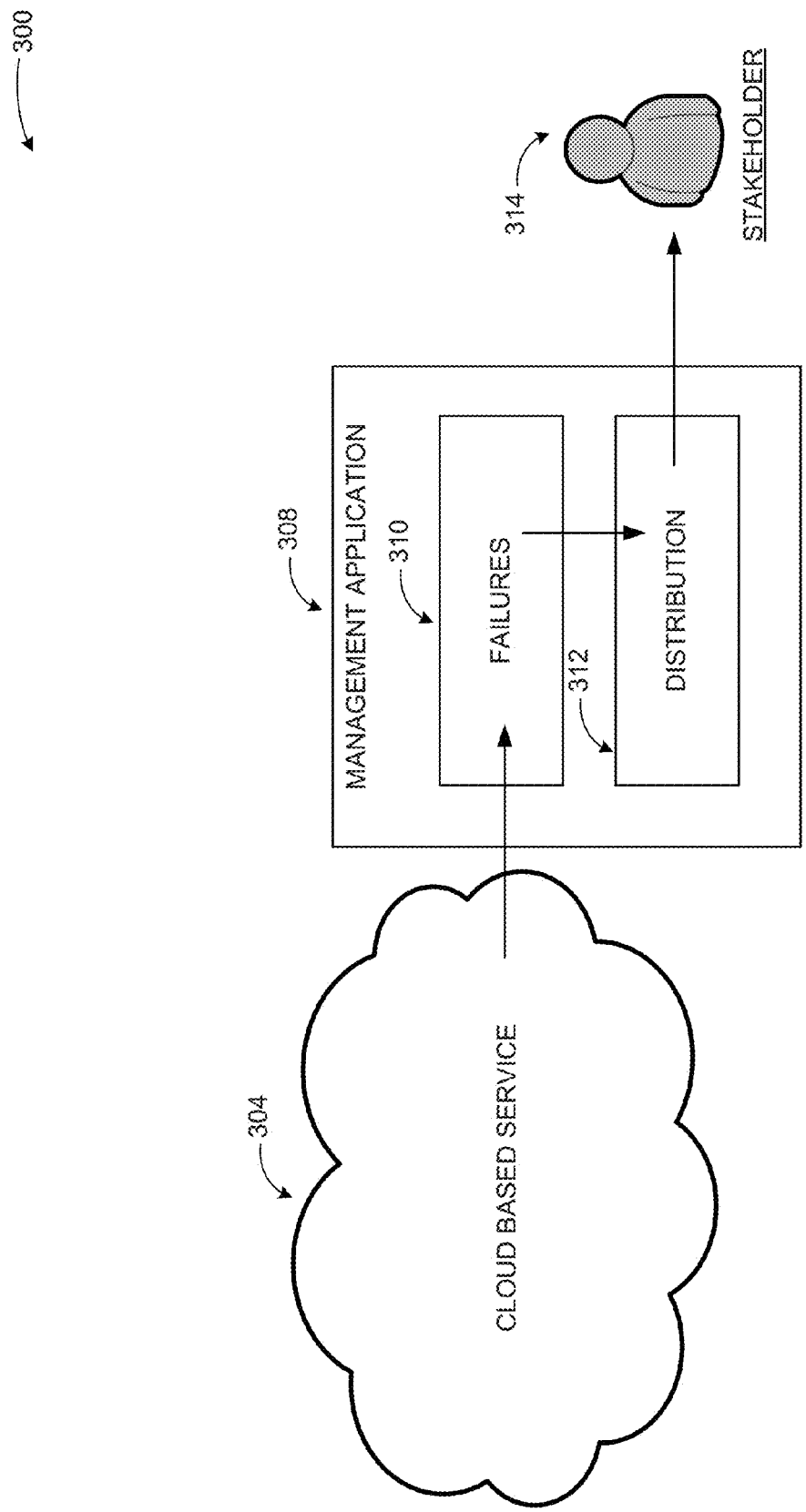
FIG. 3 illustrates additional components of a scheme to analyze failures in a cloud based service using synthetic measurements, according to embodiments.

FIG. 3 illustrates additional components of a scheme to analyze failures in a cloud based service using synthetic measurements, according to embodiments.

In a diagram 300, a management application 308 may determine failures 310 from synthetic measurements executed on a cloud based service 304. The failure 310 may be aggregated to generate a distribution 312 from the failures 310. The distribution 312 may be presented to a stakeholder 314 that may include a team that manages a component of the cloud based service 304 associated with one or more of the failures 310 or an administrator of the cloud based service 304.

The distribution 312 may be presented to the stakeholder 314 that includes an administrator of the cloud based service 304. The distribution 312 may also be presented to the stakeholder 314 that includes teams that manage components of the cloud based service 304 associated with the failures aggregated in the distribution 312. A team may be responsible to troubleshoot and resolve a subset of the failures 310 mapped to a component of the cloud based service 304. Presenting the distribution 312 to the team may inform the team about the subset of the failures 310 associated with the component.

The management application 308 may determine that a subset of the failures 310 generated by a component of the cloud based service 304 may be managed by a team. The distribution 312 may be filtered to focus on the subset. An alert that includes the distribution 312 may be transmitted to the team. The alert may highlight the subset to alert the team about the subset of the failures 310 at the component.

Characteristics of the distribution 312 may be mapped to suggested actions associated with the failures 310. Characteristics may include one or more groupings of the failures to known issues associated with components of the cloud based service 304. The suggested actions may include a restart operation associated with a component of the cloud based service that is associated with a subset of the failures 310 in the distribution 312. Additionally, teams may be determined to manage the components of the cloud based service 304 associated with the failures 310 stored within the distribution 312. Each one of the suggested actions may be transmitted to a corresponding team from the set of the teams.

The failures 310 may also be matched to corresponding components of the cloud based service 304. The distribution 312 may be organized based on the corresponding components. Subsets of the failures 310 may be clustered based on a corresponding component from the set of the components.

The synthetic measurements may also be re-executed for a continued determination of the health of the cloud based service 304. New failures may be appended and aggregated into the distribution 312.

According to some examples, information of attempted recovery actions to resolve the failures 310 may be included in the distribution 312. The information may inform the stakeholder 314 about failed recovery actions associated with a subset of the failures 310. Information captured with the failures 310 may also be included in the distribution 312. The information may include an identification of a component associated with a subset of the failures 310 or a status of the component. The status may include an operating status or a failing status. Furthermore, the distribution may be stored to alert the stakeholder 314 to focus on a subset of the failures at a top end of the stored distribution 312. The distribution 312 may be sorted based on a variety of criteria that includes (but is not exclusive to) a frequency of a failures at a component, a period of downtime of the component, a pattern of failure at the component, among others.

Figure 4:
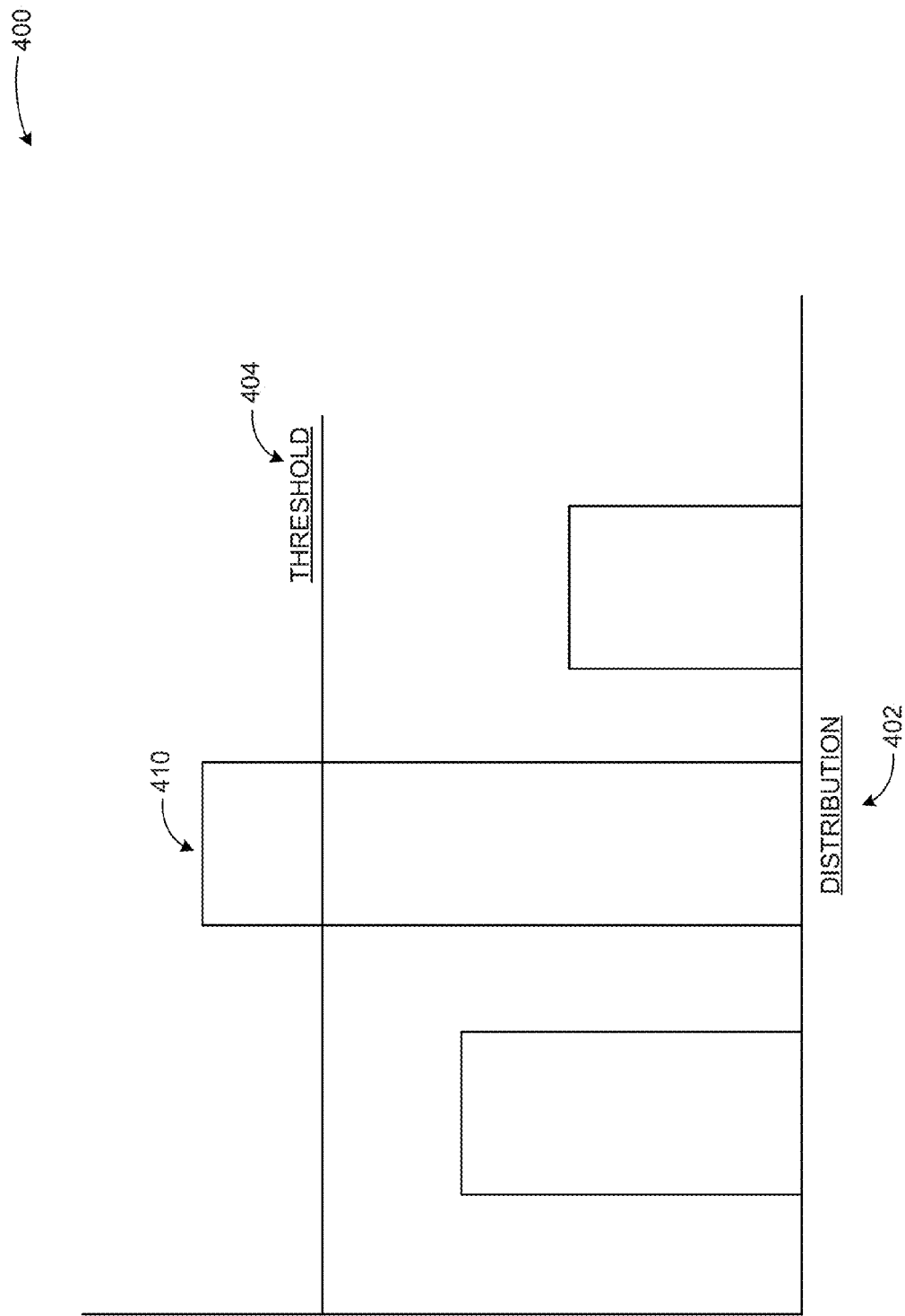
FIG. 4 illustrates an example of a distribution of failures in a cloud based service presented to a stakeholder, according to embodiments.

FIG. 4 illustrates an example of a distribution of failures in a cloud based service presented to a stakeholder, according to embodiments.

In a diagram 400, a distribution 402 may be generated by a management application from failures associated with one or more components of a cloud based service. The failures may be generated based on an execution of synthetic measurements at the cloud based service. The synthetic measurements may simulate a customer experience. The distribution 402 may include aggregated failures such as a subset 410 of the failures. The subset 410 may exceed a threshold 404. The threshold 404 may be configured by a stakeholder associated with the cloud based service such an administrator of the cloud based service or a team associated with the component that exhibits the failures that include the subset 410.

The management application may generate a histogram of the failures as the distribution 402. The histogram may include clusters of the failures as units of the histogram. Each cluster of the failures may be associated with a component of the cloud based service. In the histogram a percentage value may be included for the 410 subset of the failures based on a total number of the failures. The subset 410 may include a cluster of the failures. The management application may compare the percentage value to the threshold 404. In response to a determination that the percentage value may exceed the threshold 404, the subset may be determined to be a primary cause of a malfunction at a corresponding component of the cloud based service. A stakeholder may be informed of the primary cause of the malfunction.

Technical effect of providing failure analysis in a cloud based service using synthetic measurements may include enhancements in detection and analysis of failure conditions with one or more components of the service.

The example scenarios and schemas in FIGS. 2 and 4 are shown with specific components, data types, and configurations. Embodiments are not limited to systems according to these example configurations. Providing failure analysis in a cloud based service using synthetic measurements may be implemented in configurations employing fewer or additional components in applications and user interfaces. Furthermore, the example schema and components shown in FIGS. 2 and 4 and their subcomponents may be implemented in a similar manner with other values using the principles described herein.

Figure 5:
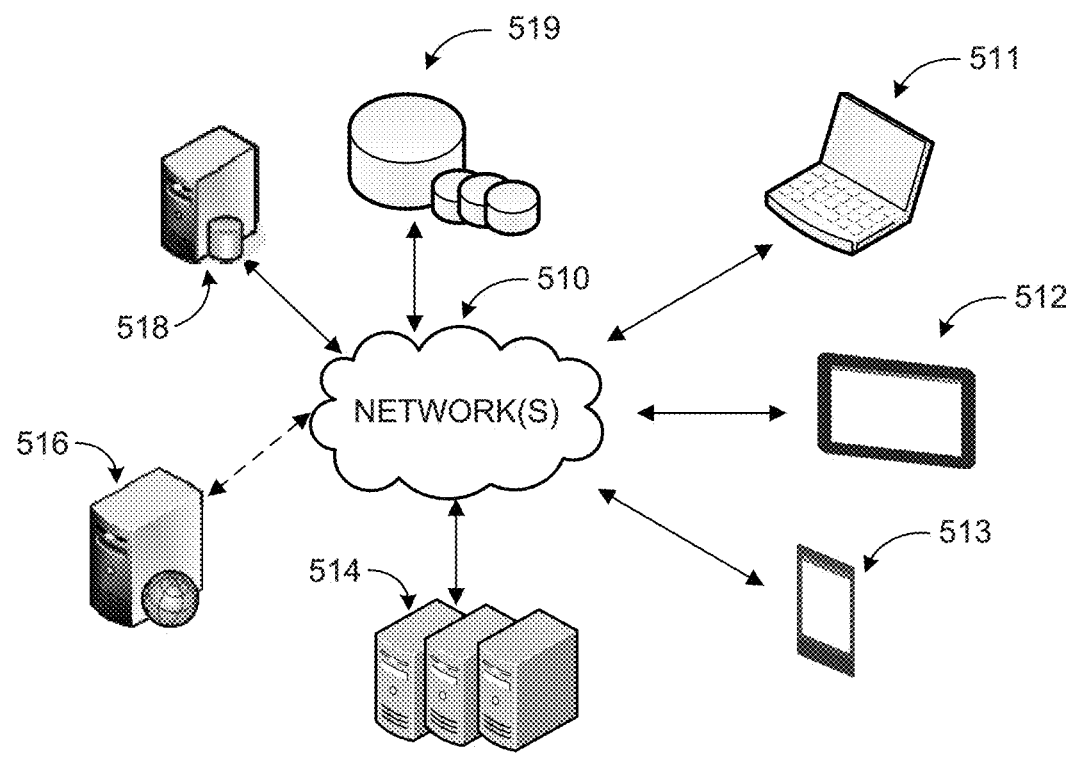
FIG. 5 is a simplified networked environment, where a system according to embodiments may be implemented.

FIG. 5 is an example networked environment, where embodiments may be implemented. A management application configured to provide failure analysis in a cloud based service using synthetic measurements may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. A management application may simulate a customer experience through synthetic measurements to determine failures at a cloud based service. The failures may be aggregated into a distribution which may be presented to a stakeholder such as a team responsible for managing a component associated with a subset of the failures. The management application may store data associated with the failures and the distribution in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide failure analysis in a cloud based service using synthetic measurements. Furthermore, the networked environments discussed in FIG. 5 are for illustration purposes only. Embodiments are not limited to the example applications, modules, or processes.

Figure 6:
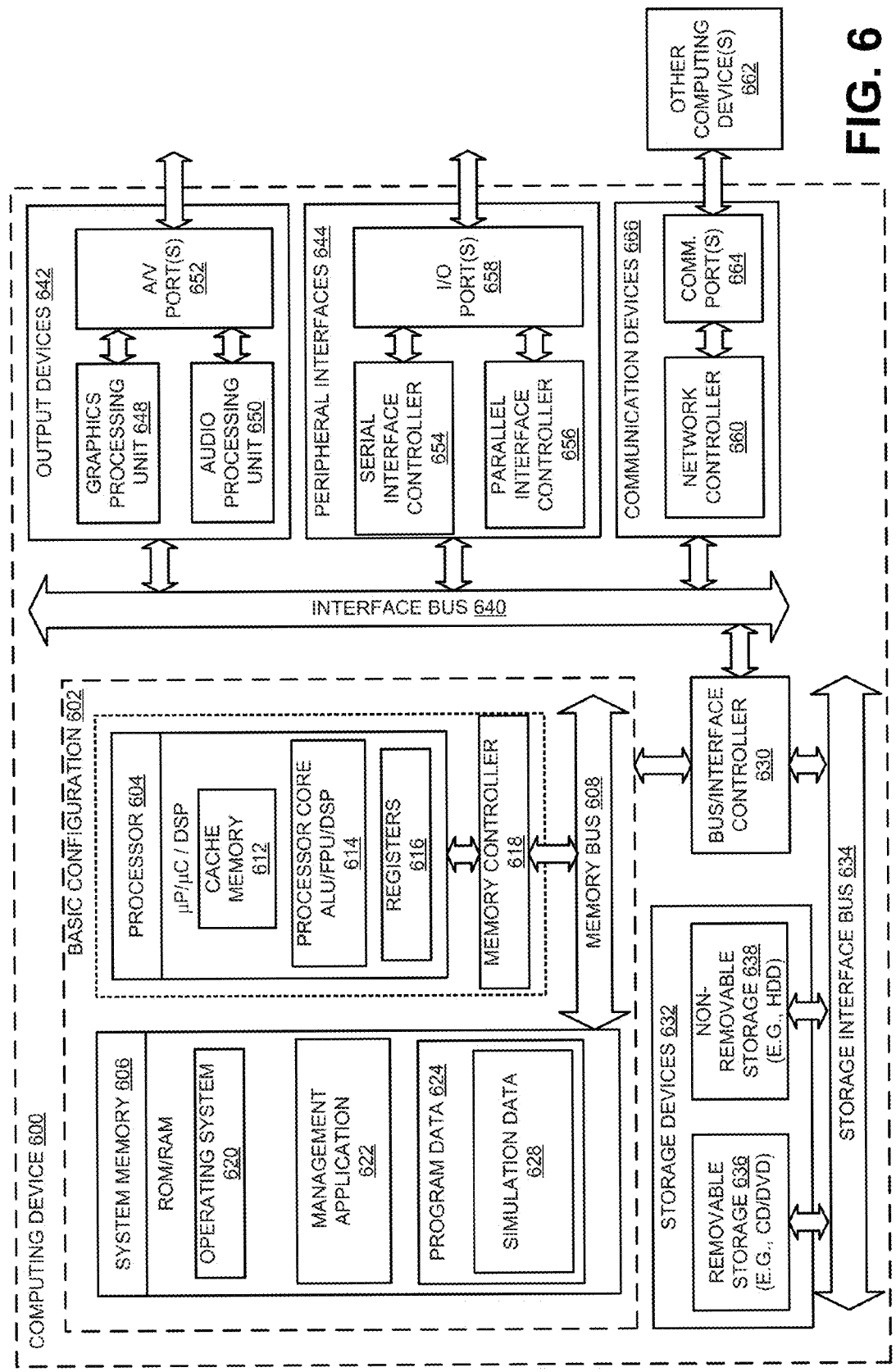
FIG. 6 illustrates a general purpose computing device, which may be configured to provide failure analysis in a cloud based service using synthetic measurements.

FIG. 6 illustrates a general purpose computing device, which may be configured to provide failure analysis in a cloud based service using synthetic measurements, arranged in accordance with at least some embodiments described herein.

For example, the computing device 600 may be used to provide failure analysis in a cloud based service using synthetic measurements. In an example of a basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including, but not limited to, a microprocessor ($\mu$P), a microcontroller ($\mu$C), a digital signal processor (DSP), or any combination thereof. The processor 604 may include one more levels of caching, such as a level cache memory 612, a processor core 614, and registers 616. The processor core 614 may include an arithmetic logic unit (ALU), a floating point unit (FPU), a digital signal processing core (DSP Core), or any combination thereof. A memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a management application 622, and a program data 624. The management application 622 may simulate a customer experience using synthetic measurements to determine one or more failures at a cloud based service. The management application 622 may aggregate the failures into a distribution which may be presented to a stakeholder to inform the stakeholder of the failures. The program data 624 may include, among other data, a simulation data 628, or the like, as described herein. The simulation data 628 may include information associated with the failures and the distribution.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636, and the non-removable storage devices 638 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 may include a graphics processing unit 648 and an audio processing unit 650, which may be configured to communicate to various external devices, such as a display or speakers via one or more A/V ports 652. One or more example peripheral interfaces 644 may include a serial interface controller 654 or a parallel interface controller 656, which may be configured to communicate with external devices, such as input devices (for example, keyboard, mouse, pen, voice input device, touch input device, etc.) or other peripheral devices (for example, printer, scanner, etc.) via one or more I/O ports 658. An example communication device 666 may include a network controller 660, which may be arranged to facilitate communications with one or more other computing devices 662 over a network communication link via one or more communication ports 664. The one or more other computing devices 662 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include failure analysis in a cloud based service using synthetic measurements. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 7:
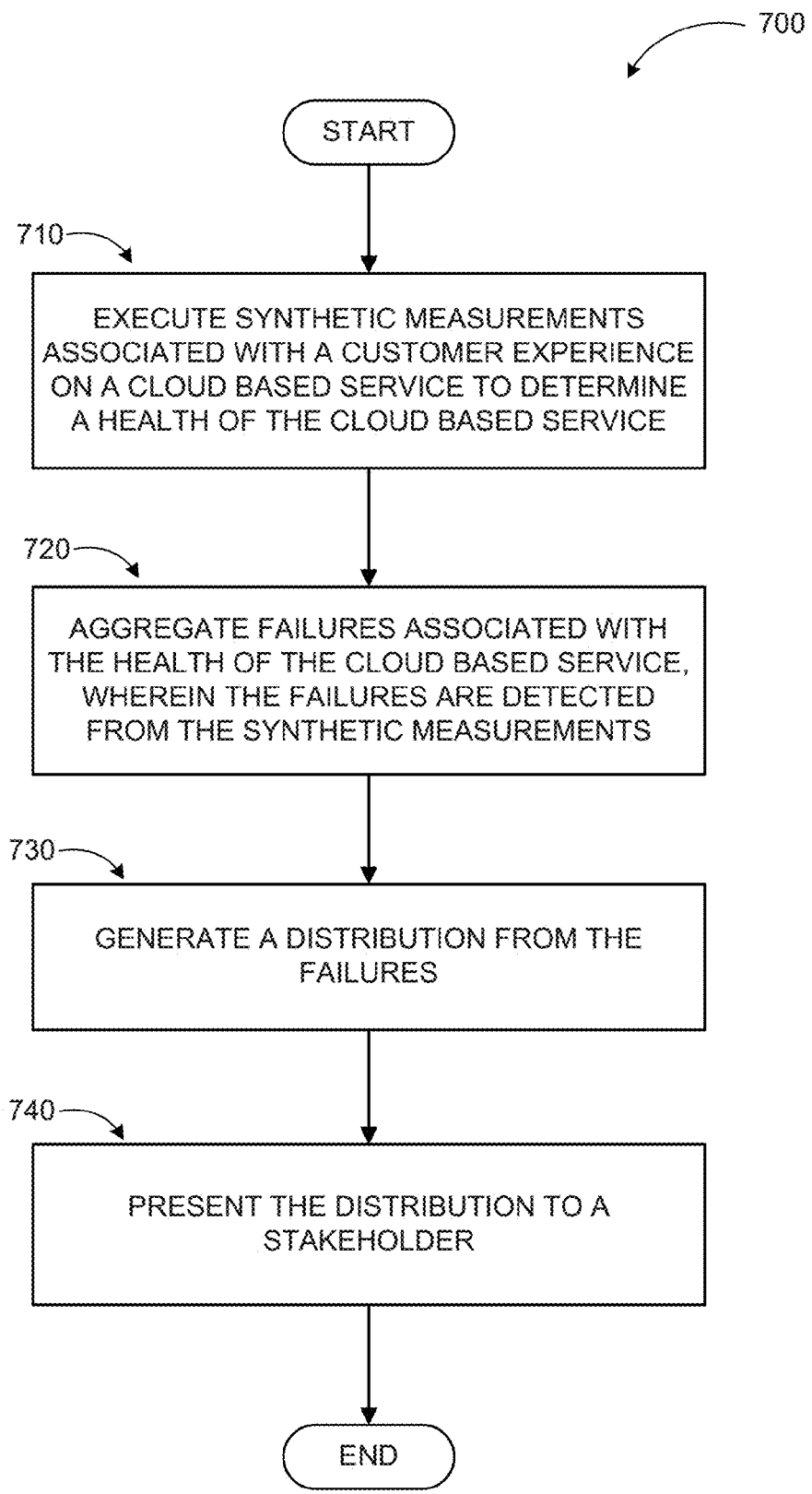
FIG. 7 illustrates a logic flow diagram for a process to provide failure analysis in a cloud based service using synthetic measurements, according to embodiments.

FIG. 7 illustrates a logic flow diagram for a process to provide failure analysis in a cloud based service using synthetic measurements, according to embodiments. Process 700 may be implemented on a management application of the cloud based service.

Process 700 begins with operation 710, where synthetic measurements associated with a customer experience on a cloud based service may be executed to determine a health of the cloud based service. The synthetic measurements may simulate the customer experience that may include a use scenario of the cloud based service by a customer. At operation 720, failures associated with the health of the cloud based service may be aggregated, where the failures may be detected from the synthetic measurements. A distribution may be generated from the failures at operation 730. At operation 740, the distribution may be presented to a stakeholder.

The operations included in process 700 are for illustration purposes. A management application according to embodiments may be implemented by similar processes with fewer or additional steps, as well as in different order of operations using the principles described herein.

According to some examples, a method that is executed on a computing device to provide a failure analysis in a cloud based service using synthetic measurements may be described. The method may include executing the synthetic measurements associated with a customer experience on the cloud based service to determine a health of the cloud based service, aggregating failures associated with the health of the cloud based service, where the failures are detected from the synthetic measurements, generating a distribution of the failures, and presenting the distribution to a stakeholder.

According to other examples, the customer experience is simulated at the cloud based service, where the customer experience includes a use scenario of the cloud based service associated with a customer. The distribution is presented to the stakeholder that includes an administrator of the cloud based service. The distribution is presented to the stakeholder that includes one or more teams that manage components of the cloud based service associated with the failures aggregated in the distribution.

According to further examples, the method may further include determining that a subset of the failures generated by a component of the cloud based service is managed by a team, filtering the distribution to focus on the subset, and transmitting an alert that includes the distribution to the team as the stakeholder. Characteristics of the distribution is mapped to one or more suggested actions associated with the failures. One or more teams is determined to manage one or more components of the cloud based service associated with the failures and each one of the one or more suggested actions are transmitted to a corresponding team from the one or more teams.

According to some examples, the method may further include analyzing the failures to aggregate the failures based on one or more shared characteristics that includes a location of a component associated with one or more of the failures and an identification of the component associated with one or more of the failures. A subset of the failures are determined to match one or more recovery actions associated with the cloud based service and the subset is removed from the distribution. The failures are matched to one or more corresponding components of the cloud based service and the distribution is organized based on the one or more corresponding components. The synthetic measurements are re-executed for a continued determination of the health of the cloud based service and new failures are appended into the distribution.

According to some examples, a computing device to provide a failure analysis in a cloud based service using synthetic measurements may be described. The computing device may include a memory, a processor coupled to the memory. The processor may be configured to execute a management application in conjunction with instructions stored in the memory. The management application may be configured to execute the synthetic measurements associated with a customer experience on the cloud based service to determine a health of the cloud based service, where the customer experience includes a use scenario of the cloud based service associated with a customer, aggregate failures associated with the health of the cloud based service, where the failures may be detected from the synthetic measurements, generate a distribution of the failures, and present the distribution to a stakeholder.

According to other examples, the management application is further configured to generate a histogram of the failures as the distribution and include in the histogram a percentage value for a subset of the failures based on a total number of the failures. The management application is further configured to compare the percentage value to a threshold and in response to a determination that the percentage value exceeds the threshold, determine that the subset is a primary cause of a malfunction at a corresponding component of the cloud based service.

According to some examples, the management application is further configured to include information of attempted recovery actions associated with the failures in the distribution. Information captured with the failures is included in the distribution, where the information includes one or more from a set of an identification of a component associated with one of the failures and a status of the component. The distribution is sorted to alert the stakeholder to focus on a subset of the failures at a top end of the sorted distribution According to some examples, a computer-readable memory device with instructions stored thereon to provide a failure analysis in a cloud based service using synthetic measurements may be described. The instructions may include actions that are similar to the method described above.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to provide a failure analysis in a cloud based service using synthetic measurements, the method comprising:
   executing the synthetic measurements associated with a customer experience on the cloud based service to determine a health of the cloud based service, wherein the synthetic measurements include simulations of the customer experience at the cloud based service;
   parsing usage data from a log file received from a client device, wherein the usage data is anonymized and the usage data includes measurements of one or more customer actions of one or more use scenarios of the cloud based service;
   aggregating failures associated with the health of the cloud based service, wherein the failures are detected from the synthetic measurements and the usage data;
   generating a distribution of the failures;
   removing a selection of the failures that matches a successful recovery action associated with the cloud based service from the distribution;
   including information of a failed recovery action associated with other selection of the failures in the distribution, wherein the information includes an identification and an operational status of a component of the cloud based service generating the other selection of the failures; and
   presenting the distribution to a stakeholder.

2. The method of claim 1, further comprising:
   simulating the customer experience at the cloud based service, wherein the customer experience includes the one or more use scenarios of the cloud based service associated with a customer.

3. The method of claim 1, further comprising:
   presenting the distribution to the stakeholder that includes an administrator of the cloud based service.

4. The method of claim 1, further comprising:
   presenting the distribution to the stakeholder that includes one or more teams that manage the component or one or more other components of the cloud based service associated with the failures aggregated in the distribution.

5. The method of claim 1, further comprising:
   determining that a subset of the failures generated by the component of the cloud based service is managed by a team;
   filtering the distribution to focus on the subset; and
   transmitting an alert that includes the distribution to the team as the stakeholder.

6. The method of claim 1, further comprising:
   mapping characteristics of the distribution to one or more suggested actions associated with the failures.

7. The method of claim 6, further comprising:
   determining One or more teams that manage the component or one or more other components of the cloud based service associated with the failures; and
   transmitting each one of the one or more suggested actions to a corresponding team from the one or more teams.

8. The method of claim 1, further comprising:
   analyzing the failures for an aggregation based on one or more shared characteristics that includes one or more from a set of a location of the component associated with one or more of the failures and the identification of the component associated with one or more of the failures.

9. The method of claim 1, further comprising:
   matching the failures to the component or one or more other components of the cloud based service; and
   organizing the distribution based on the component or the one or more other components.

10. The method of claim 1, further comprising:
    re-executing the synthetic measurements for a continued determination of the health of the cloud based service; and
    appending new failures into the distribution.

11. A computing device to provide a failure analysis in a cloud based service using synthetic measurements, the computing device comprising:
    a memory;

a processor coupled to the memory, the processor executing a management application in conjunction with instructions stored in the memory, wherein the management application is configured to:
 execute the synthetic measurements associated with a customer experience on the cloud based service to determine a health of the cloud based service, wherein the synthetic measurements include simulations of the customer experience at the cloud based service and the customer experience includes one or more use scenarios if the cloud based service associated with a customer;
 parse usage data from a log file received from a client device, wherein the usage data is anonymized, wherein the usage data includes measurements of one or more customer actions of the one or more use scenarios of the cloud used service;
 aggregate failures associated with the health of the cloud based service, wherein the failures may be detected from the synthetic measurements and the usage data;
 generate a distribution of the failures;
 remove a selection of the failures that matches a successful recovery action associated with the cloud based service from the distribution;
 include information of a failed recovery action associated with other selection of the failures in the distribution, wherein the information includes an identification and an operational of a component of the cloud based service generating the other selection of the failures; and
 present the distribution to a stakeholder.

12. The computing device of claim 11, wherein the management application is further configured to:
 generate a histogram of the failures as the distribution; and
 include in the histogram a percentage value for a subset of the failures based on a total number of the failures.

13. The computing device of claim 12, wherein the management application is further configured to:
 compare the percentage value to a threshold; and
 in response to a determination that the percentage value exceeds the threshold, determine that the subset is to primary cause of to malfunction at the component of the cloud based service.

14. The computing device of claim 11, wherein the management application is further configured to:
 include information captured with the failures in the distribution, wherein the information includes the identification and the operational status of the component.

15. The computing device of claim 11, wherein the management application is further configured to:
 sort the distribution to alert the stakeholder to focus on a subset of the failures at a top end of the sorted distribution.

16. A computer-readable memory device with instructions stored thereon to provide a failure analysis in a cloud based service using synthetic measurements, the instructions comprising:
 executing the synthetic measurements associated with a customer experience on the cloud based service to determine a health of the cloud based service, wherein the synthetic measurements include simulations of the customer experience at the cloud based service, and wherein the customer experience includes one or more use scenarios of the cloud based service associated with a customer;
 parsing usage data from a log file received from a client device, wherein the usage data is anonymized and the usage data includes measurements of one or more customer actions of the one or more use scenarios of the cloud based service;
 aggregating failures associated with the health of the cloud based service, wherein the failures are detected from the synthetic measurements and the usage data;
 generating a distribution of the failures;
 removing a selection of failures that matches a successful recovery action associated with the cloud based service from the distribution;
 including information of a failed recovery action associated with other selection of the failures in the distribution, wherein the information includes an identification and an operational status of a component of the cloud based service generating the other selection of the failures; and
 presenting the distribution to a stakeholder.

17. The computer-readable memory device of claim 16, wherein the instructions further comprise:
 generating a histogram of the failures as the distribution;
 including in the histogram a percentage value for a subset of the failures based on a total number of the failures;
 comparing the percentage value to a threshold; and
 in response to a determination that the percentage value exceeds the threshold, determining that the subset associated with the percentage value is a primary cause of a malfunction at the component of the cloud based service.

18. The computer-readable memory device of claim 16, wherein the instructions further comprise:
 presenting the distribution to the stakeholder that includes an administrator of the cloud based service or one or more teams that manage the component or one or more other components of the cloud based service associated with the failures aggregated in the distribution.

* * * * *